US006689844B2

United States Patent
Roos et al.

(10) Patent No.: US 6,689,844 B2
(45) Date of Patent: Feb. 10, 2004

(54) PROCESS FOR SYNTHESIS OF POLYMER COMPOSITIONS WITH REDUCED HALOGEN CONTENT, POLYMER COMPOSITION WITH REDUCED HALOGEN CONTENT AS WELL AS USE OF THIS COMPOSITION

(75) Inventors: Sebastian Roos, Mainz (DE); Joseph Martin Bollinger, North Wales, PA (US); Markus Scherer, Lebach (DE)

(73) Assignee: RohMax Additives GmbH, Darmstadt, (DE)

(*) Notice: Subject to any disclaimer, the term of this patent is extended or adjusted under 35 U.S.C. 154(b) by 0 days.

(21) Appl. No.: 09/865,519

(22) Filed: May 29, 2001

(65) Prior Publication Data

US 2002/0188081 A1 Dec. 12, 2002

(51) Int. Cl.$^7$ .............. C08F 6/02; C08F 8/26; C08F 120/02
(52) U.S. Cl. ........... 525/382; 525/381; 525/379; 525/330.5
(58) Field of Search ............... 525/382, 381, 525/379, 330.5

(56) References Cited

U.S. PATENT DOCUMENTS 5,763,548 A * 6/1998 Matyjaszewski et al. ... 526/135
5,807,937 A * 9/1998 Matyjaszewski et al. ... 526/135
6,268,433 B1 * 7/2001 Barkac et al. ............ 525/92 F
6,348,554 B1   2/2002 Roos et al.
6,433,100 B1 * 8/2002 Kramer et al. ........... 525/327.6

FOREIGN PATENT DOCUMENTS

WO    WO-99/54365    * 10/1999

OTHER PUBLICATIONS

Pine, "Organic Chemistry", 5th ed., McGraw Hlll Book Co., New York, pp 485–486 (1987).*

* cited by examiner

*Primary Examiner*—D. R. Wilson
(74) *Attorney, Agent, or Firm*—Oblon, Spivak, McClelland, Maier & Neustadt, P.C.

(57) ABSTRACT

Polymer compositions with reduced living halogen content are used as additive to lubricating oils and are prepared by polymerizing at least one ethylenically unsaturated monomer using a) at least one initiator containing a transferable halogen and b) one or more metal catalysts containing at least one transition metal, in the presence of ligands which can form a coordination compound with the one or more metal catalysts, to obtain a polymer composition having a living halogen content, and after the polymerizing, reacting the polymer composition having a living halogen content with at least one organic nitrogen compound in the presence of a nonpolar solvent, thereby reducing the living halogen content to obtain the polymer composition having a reduced halogen content.

25 Claims, No Drawings

PROCESS FOR SYNTHESIS OF POLYMER COMPOSITIONS WITH REDUCED HALOGEN CONTENT, POLYMER COMPOSITION WITH REDUCED HALOGEN CONTENT AS WELL AS USE OF THIS COMPOSITION

Invention relates to a process for synthesis of polymer compositions with reduced living halogen content, wherein ethylenically unsaturated monomers are first polymerized by means of initiators containing a transferable halogen and of one or more catalysts comprising at least one transition metal in the presence of ligands which can form a coordination compound with the metal catalyst or catalysts. The invention also relates to polymer compositions with reduced living halogen content as well as to the use of these polymer compositions.

Radical polymerization is an important commercial process for synthesis of diverse polymers, such as PMMA and polystyrene. It suffers from the disadvantage that it is relatively difficult to control the composition of the polymers, the molecular weight and the molecular weight distribution.

One solution to this problem is offered by the so-called ATRP process (=Atom Transfer Radical Polymerization). It is assumed that this process comprises "living" radical polymerization, although the description of the mechanism is not to be construed as limitative. In this process a transition metal compound is reacted with a compound containing a transferable group of atoms. Under these conditions the transferable group of atoms is transferred to the transition metal compound, whereby the metal is oxidized. A radical that adds onto ethylenic groups is formed in this reaction. The transfer of the group of atoms to the transition metal compound is reversible, however, and so the group of atoms is transferred back to the growing polymer chain, whereby a controlled polymerization system is formed. Accordingly it is possible to control the composition of the polymer, the molecular weight and the molecular weight distribution.

This reaction procedure is described, for example, by J-S. Wang et al., J. Am. Chem. Soc., Vol. 117, pp. 5614–5615, and by Matyjaszewski, Macromolecules, Vol. 28, pp. 7901–7910 (1995). Furthermore, International Patent Applications WO 96/30421, WO 97/47661, WO 97/18247, WO 98/40415 and WO 99/10387 disclose modifications of the aforesaid ATRP.

The mechanism described hereinabove is not undisputed. WO 97/47661, for example, states that polymerization takes place by insertion, and not by a radical mechanism. Such a differentiation is not pertinent to the present invention, however, since in the reaction procedure disclosed in WO 97/47661 there are used compounds which are also employed for ATRP.

The advantages of known ATRP polymerization processes, however, are largely limited to monomers which are themselves polar or which are readily soluble in polar media. Certainly the occasional use of nonpolar aprotic hydrocarbons such as benzene, toluene, xylene cyclohexane and hexane is also known from the literature, but the polymers synthesized with these solvents exhibit much greater polydispersity. This effect is described in, for example, WO 98/40415.

Usually the polymers obtainable by ATRP processes contain halogen atoms, which as the living chain end permit a narrow molecular weight distribution. Nevertheless, these halogens, which usually are necessarily present at the chain end, are associated with disadvantages. For example, these halogen constituents can be liberated during decomposition of the polymers. Especially upon contact with metals such as are contained in pumps, motors and similar components, liberated halogens cause corrosion, which leads to destruction of the pumps, motors, etc. Furthermore, the halogens lead to problems in reprocessing of the polymers. In particular, combustion can lead to highly toxic dioxins.

The associated problems as well as a process for removal of halogens from polymers obtained by ATRP processes are described in, for example, International Patent Application WO 99/54365. This document describes a process in which the living halogens are transformed to double bonds, by reacting the ATRP polymer containing a halogen atom as the active chain end subsequent to polymerization with a compound containing a double bond capable of limited ATRP polymerization. The compound containing the double bond capable of limited polymerization is added to the living end of the ATRP polymer, and the living halogen atom is eliminated with formation of a double bond. 1,1-Dimethylethylene, 1,1-diphenylethylene, vinyl acetate, isoprenyl acetate, α-methylstyrene, 1,1-dialkoxyolefin, dimethyl itaconate and diiusobutene are explicitly disclosed therein as compounds containing the double bond capable of limited polymerization.

In nonpolar solvents such as mineral oils, however, the use of this process does not lead to the desired elimination of the living halogen atom at the active chain end and to the formation of the terminal double bond. Instead, the living halogen remains unchanged in the polymer.

Nevertheless, processes which can be carried out in nonpolar solvents in order to synthesize ATRP polymer compositions with reduced living halogen content at the active chain end are needed by industry. Such processes would be universally advantageous, especially for synthesis of polymer products such as mineral-oil additives for use in nonpolar solvents, because the otherwise necessary step for changing solvents is obviated. Instead, the desired compositions could be synthesized directly.

The paper by M. Bednarek, T. Biedroni and P. Kubisa entitled "Synthesis of block copolymers by atom transfer radical polymerization of tert-butyl acrylate with poly (oxyethylene) macroinitiators", Macromol. Rapid Commun., 20, 59–65 (1999), describes the ATRP bulk polymerization of tert-butyl acrylate using a polyoxyethylene macroinitiator. CuBr is used as catalyst and pentamethyldiethylenetriamine (PMDETA) as the ligand. During this polymerization, the living halogen at the active chain end is replaced by hydrogen in a side reaction. In this connection, the authors (page 65, 1st paragraph) do not rule out participation of the PMDETA in the exchange reaction. A process for selective removal of the living halogen at the active chain end of the ATRP polymer and for formation of a polymer with a terminal double bond is not disclosed by this paper.

In view of the prior art, it was now an object of the present invention to provide processes for synthesis of polymer compositions with reduced halogen content, wherein the living halogen atom at the active chain end should be substantially removed.

A further object was to provide a process that can be performed inexpensively and applied on a large industrial scale. Furthermore, the process should be possible easily and simply with commercially available components.

Furthermore, broadening of the molecular-weight distribution of the polymer composition should be prevented by the reaction.

A further object of the present invention was to provide, for synthesis of polymer compositions with reduced halogen content, a process in which decomposition of the polymers contained in the composition is prevented.

A further object was to find polymer compositions which have an excellent spectrum of properties, so that they can be added as an ideal additive to lubricating oils.

This means among other requirements that the polymers contained in the composition have low sensitivity to oxidation and high resistance to shear loads.

In particular, the polymers contained in the polymer composition must have a narrow molecular-weight distribution and be substantially halogen-free.

These objects are achieved by a process for synthesis of a polymer composition having all features of claim 1, as are other objects which are not explicitly cited but which can be obviously derived or inferred from the relationships discussed herein in the introduction. Advantageous modifications of the inventive process are protected in the dependent claims which refer back to claim 1. As regards the polymer compositions, the independent product claim provides a solution to the underlying problem, while the claim from the use category protects a preferred use of a polymer solution synthesized according to the present process.

By the fact that, after polymerization, the polymer composition is reacted with at least one organic nitrogen compound in the presence of a nonpolar solvent, it has become possible in a way that is not directly foreseeable to provide, for synthesis of a polymer composition, a process with which the living halogen content of the polymer can be reduced directly in a nonpolar solvent.

For this purpose ethylenically unsaturated monomers are polymerized by means of initiators containing a transferable halogen and of one or more catalysts comprising at least one transition metal in the presence of ligands which can form a coordination compound with the metal catalyst or catalysts. This type of synthesis can be achieved particularly inexpensively and in this regard is of industrial interest.

At the same time, several other advantages can be achieved by the inventive process. They include among others:

A narrow distribution of the polymers in the polymer compositions synthesized by the process.

The inventive process permits excellent control of the molecular weight of the polymers contained in the compositions.

The polymerization can be performed with relatively few problems as regards pressure, temperature and solvent, acceptable results being obtained under certain circumstances even at moderate temperatures.

The inventive process has very few side reactions.

The process can be performed inexpensively.

The polymer is decomposed not at all or only slightly by the process.

High yields can be achieved by means of the inventive process.

Substantially double bonds are formed by the reaction with the organic nitrogen compound. These can be used if necessary for further reactions analogous to those of polymers.

Polymers with a predetermined composition and tailor-made structure can be synthesized by means of the process of the present invention.

The polymer compositions obtainable by the process of the present invention are relatively stable to oxidative decomposition and to shear loading.

The halogen-reducing reaction of the polymers obtained by the ATRP processes with an organic nitrogen compound takes place in the presence of a nonpolar solvent.

This includes hydrocarbon solvents, examples being aromatic solvents such as toluene, benzene and xylene, and saturated hydrocarbons such as cyclohexane, heptane, octane, nonane, decane, dodecane, which may also be used in branched form. These solvents can be used individually and also as a mixture. Particularly preferred solvents are mineral oils and synthetic oils as well as mixtures thereof. Of these, mineral oils are most particularly preferred.

Mineral oils are known in themselves and are commercially available. They are generally obtained from petroleum or crude oil by distillation and/or refining and if necessary further purification and conversion processes. In this connection the term mineral oil applies in particular to the higher-boiling fractions of crude oil or petroleum. In general, the boiling point of mineral oil is higher than 200° C., preferably higher than 300° C. at 5000 Pa. Synthesis by low-temperature carbonization of shale oil, coking of bituminous coal, distillation of lignite with exclusion of air as well as hydrogenation of bituminous coal or lignite is also possible. A small proportion of mineral oils is also obtained from raw materials originating from plants (such as jojoba, rape) or animals (such as neatsfoot oil). Accordingly, mineral oils contain various proportions of aromatic, cyclic, branched and straight-chain hydrocarbons, depending on origin.

In general, a distinction is made between paraffin-base, naphthenic and aromatic fractions in crude oils or mineral oils. In this connection the term paraffin-base fraction stands for relatively long-chain or highly branched isoalkanes, and naphthenic fraction stands for cycloalkanes. Furthermore, depending on their origin and conversion process, mineral oils contain different proportions of n-alkanes, isoalkanes with low degree of branching, so-called monomethyl-branched paraffins, and compounds with heteroatoms, especially O, N and/or S, with which there are associated polar properties. The proportion of n-alkanes in preferred mineral oils is less than 3 wt %, the proportion of the compounds containing O, N and/or S is less than 6 wt %. The proportion of aromatics and of monomethyl-branched paraffins is generally in the range of 0 to 30 wt % each. According to one interesting aspect, mineral oil comprises mainly naphthenic and paraffin-base alkanes, which in general contain more than 13, preferably more than 18 and most particularly preferably more than 20 carbon atoms. The proportion of these compounds is generally $\geq 60$ wt %, preferably $\geq 80$ wt %, but these values are not to be construed as limitative.

An analysis of especially preferred mineral oils performed using conventional techniques such as urea separation and liquid chromatography on silica gel reveals, for example, the following constituents. In this connection, the percentage values refer to the total weight of the particular mineral oil being used:

n-alkanes with about 18 to 31 C atoms:
0.7 to 1.0%,
slightly branched alkanes with 18 to 31 C atoms:
1.0 to 8.0%,
aromatics with 14 to 32 C atoms:
0.4 to 10.7%,
isoalkanes and cycloalkanes with 20 to 32 C atoms:
60.7 to 82.4%,
polar compounds:
0.1 to 0.8%
loss:
6.9 to 19.4%.

Valuable information on analysis of mineral oils as well as a listing of mineral oils having different composition can be found in, for example, Ullmanns Encyclopedia of Industrial Chemistry, 5th Edition on CD-ROM, 1997, key word "lubricants and related products".

Synthetic oils include among other compounds organic esters, organic ethers such as silicone oils, and synthetic hydrocarbons, especially polyolefins. They are usually somewhat more expensive than mineral oils, but have advantages in terms of performance. Further elucidation can be found in the 5 API categories of base-oil types (API: American Petroleum Institute). In this connection these base oils can be used particularly preferably as solvents. These solvents are used before or during the reaction to reduce the halogen content of the polymers, preferably in a proportion of 1 to 99 wt %, especially preferably 5 to 95 wt % and most particularly preferably 10 to 60 wt % relative to the total weight of the mixture. During the reaction with an organic nitrogen compound, the composition may also contain polar solvents, but the proportion thereof is limited by the fact that these solvents must not exert any unacceptably detrimental effect on the halogen-reducing reaction.

According to the invention, the living halogens present as active centers in the polymer are at least partly eliminated. In this connection the term "living halogens" denotes the halogens bound to the reactive centers at the chain ends. The reactive centers remain intact even after complete "living" radical polymerization (ATRP) of the initially used monomers, and thus permit the addition of further monomers. Preferably each polymer contains one living halogen at first, although more than one living halogen per polymer chain is also conceivable. The active chain end containing the living halogen is preferably transformed to a double bond by the elimination.

In the scope of the present invention, an organic nitrogen compound is used for reduction of the living halogen content of the polymer. Organic nitrogen compounds are known in themselves. Besides one or more nitrogen atoms, they contain alkyl, cycloalkyl or aryl groups, and the nitrogen atom may also be a member of a cyclic group.

Organic nitrogen compounds that can bind metal atoms or function as ligands are preferred. Such compounds are described as ligands later in the text. These organic nitrogen compounds usable as ligands are described in International Patent Applications WO 97/18247, WO 98/40415 and WO 97/47661 among other documents.

They include, among others, heterocyclic aromatic nitrogen compounds. These are aromatic compounds which contain cyclic groups with 4 to 12 carbon atoms and in which one or more CH groups of the aromatic rings are replaced by nitrogen atoms.

They include in particular compounds which contain one or more pyrrole, imadizole, indole, quinoline, isoquinoline, pyrimidine or pyridine groups. Examples of such compounds are 2,2-bipyridine, alkyl-2,2-bipyridine, such as 4,4-di-(5-nonyl)-2,2-bipyridine, 4,4-di-(5-heptyl)-2,2-bipyridine.

Organic nitrogen groups containing aliphatic groups are also preferred. These are compounds which contain saturated or unsaturated alkyl groups or cycloalkyl groups in addition to the nitrogen atom.

Many of these organic nitrogen compounds can be represented in general by the formula $R^{31}$—Z—$(R^{33}$—Z$)_m$—$R^{32}$, wherein $R^{31}$ and $R^{32}$ independently denote H, $C_1$ to $C_{20}$ alkyl, aryl or heterocyclyl, which may or may not be substituted, and m denotes an integral number ranging from 0 to 10, preferably 1 to 3. These substituents include alkoxy groups and the alkylamino groups among others. $R^{31}$ and $R^{32}$ may form a saturated, unsaturated or heterocyclic ring as the case may be. Particularly preferably $R^{31}$ and $R^{32}$ represent hydrogen, methyl, ethyl and propyl, methyl being preferred among those. Z denotes NH or $NR^{34}$, wherein $R^{34}$ has the same meaning as $R^{31}$. Particularly preferably $R^{34}$ represents hydrogen, methyl, ethyl and propyl, methyl being preferred among those. $R^{33}$ independently denotes a divalent group with 1 to 40 C atoms, preferably 2 to 4 C atoms, which may be straight-chain, branched or cyclic, such as a methylene, ethylene, propylene, butylene or cyclohexylene group.

Alkyl groups are saturated or unsaturated, branched or straight-chain hydrocarbon groups with 1 to 40 carbon atoms, such as methyl, ethyl, propyl, butyl, pentyl, 2-methylbutyl, pentenyl, cyclohexyl, heptyl, 2-methylheptenyl, 3-methylheptyl, octyl, nonyl, 3-ethylnonyl, decyl, undecyl, 4-propenylundecyl, dodecyl, tridecyl, tetradecyl, pentadecyl, hexadecyl, heptadecyl, octadecyl, nonadecyl, eicosyl, cetyleicosyl, docosyl and/or eicosyltetratriacontyl.

Aryl groups are cyclic aromatic groups having 6 to 14 carbon atoms in the aromatic ring. These groups may be substituted. Examples of substituents are straight-chain and branched alkyl groups with 1 to 6 carbon atoms, such as methyl, ethyl, propyl, butyl, pentyl, 2-methylbutyl or hexyl; cycloalkyl groups such as cyclopentyl and cyclohexyl; aromatic groups such as phenyl or naphthyl; amino groups, ether groups, ester groups as well as halides.

Heterocyclyl groups are cyclic groups with 4 to 12 carbon atoms, in which one or more of the $CH_2$ groups of the ring is or are replaced by heteroatom-containing groups, such as O, S, NH and/or NR, wherein the group R has the same meaning as $R^{31}$.

Preferred aliphatic nitrogen compounds are tris(2-aminoethyl)amine (TREN), tributylamine, N,N-diphenyl-1,4-phenylenediamine, $C_{13}H_{27}$—$NH_2$, N,N,N',N',N"-pentamethyldiethylenetriamine (PMDETA), 1,1,4,7,10,10-hexamethyltriethylenetetramine and/or tetramethylethylenediamine (TMEDA), diethylenetriamine (DETA).

Furthermore, organic nitrogen compounds in which at least one methyl group is bound to the nitrogen atom are particularly preferred, such as hexamethyltriethylenetetramine, PMDETA or TMEDA.

These compounds can be used individually or as mixtures. The proportion depends on the living halogen content of the composition. Preferably the molar ratio of organic nitrogen compound to living halogen is 0.5:1 to 10:1, expediently 0.5:1 to 4:1, especially 1.25:1 to 4:1.

It was particularly surprising that a reduction of the living halogen content can be achieved by means of organic nitrogen compounds that can be used as ligands during the polymerization, even though this exchange leads to a termination reaction. Accordingly, the proportion of the organic nitrogen compounds is preferably increased to the values indicated in the foregoing after completion of the polymerization.

It is assumed that metal-containing catalysts as well as ligands, which preferably contain nitrogen, must also be present during the reaction.

In a particularly surprising result, however, it was found that the conversion of the reaction that leads to reduction of the living halogen content of the polymer can be increased when the organic nitrogen preferably used as the ligand is present in excess relative to the metal, although this requirement is not to be construed as limitative.

The reaction of the polymer containing the living halogen with the organic nitrogen compound can be performed at normal pressure, reduced pressure or above-atmospheric pressure. The reaction temperature also is not critical. In general, however, it ranges from −20° C. to 200° C., preferably 20° C. to 200° C., and particularly preferably 90° C. to 150° C., although these values are not to be construed as limitative. The duration of the reaction depends on the parameters described in the foregoing. Usually a large decrease of the living halogen content is already found after one hour, although this value is not to be construed as limitative. If the most complete possible exchange is to be achieved, a relatively long reaction duration, which may range from 2 to 48 hours, will be necessary in some cases.

It is characteristic of the reaction according to the present invention that the living halogen atoms contained in the polymer are eliminated at least partly hereby. This observation is true for the living halogen content of the polymers, or in other words the content of living halogen before and after the reaction, in which connection the term partly can mean a reduction of the content by, for example, 5 wt %, in each case relative to the starting content of living halogens.

In preferred embodiments of the inventive process, the reduction of the living halogen content is much larger, and so the living halogen content is preferably reduced to 60 wt %, particularly preferably to 30 wt % and most particularly preferably 5 wt %, in each case relative to the starting content of living halogens, although these values are not to be construed as limitative.

Polymers obtainable preferably by the process of the present invention preferably have a living halogen content of smaller than or equal to 1000 ppm, expediently smaller than or equal to 600 ppm, especially smaller than or equal to 200 ppm and particularly preferably smaller than or equal to 100 ppm, relative to the total weight of the composition.

In the present invention, any monomer capable of radical polymerization can be used as the monomer. Especially suitable as monomers for polymerization according to the present invention, however, are compounds corresponding to the formula:

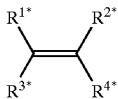

wherein $R^{1*}$ and $R^{2*}$ are selected independently from the group comprising hydrogen, halogens, CN, straight-chain or branched alkyl groups with 1 to 20, preferably 1 to 6 and especially preferably 1 to 4 carbon atoms, which may be substituted with 1 to (2n+1) halogen atoms, wherein n is the number of carbon atoms of the alkyl group (for example, $CF_3$), α,β-unsaturated straight-chain or branched alkenyl or alkynyl groups with 2 to 10, preferably 2 to 6 and especially preferably 2 to 4 carbon atoms, which may be substituted with 1 to (2n−1) halogen atoms, preferably chlorine, wherein n is the number of carbon atoms of the alkyl group, for example $CH_2$=CCl—, cycloalkyl groups with 3 to 8 carbon atoms, which may be substituted with 1 to (2n−1) halogen atoms, preferably chlorine, wherein n is the number of carbon atoms of the cycloalkyl group; $C(=Y^*)R^{5*}$, $C(=Y^*)NR^{6*}R^{7*}$, $Y^*C(=Y^*)R^{5*}$, $SOR^{5*}$, $SO_2R^{5*}$, $OSO_2R^{5*}$, $NR^{8*}SO_2R^{5*}$, $PR^{5*}_2$, $P(=Y)R^{5*}_2$, $Y^*PR^{5*}_2$, $Y^*P(=Y^*)R^{5*}_2$, $NR^{8*}_2$ which can be quaternized with an additional $R^{8*}$, aryl or heterocyclyl group, wherein $Y^*$ can be $NR^{8*}$, S or O, preferably O; $R^{5*}$ is an alkyl group with 1 to 20 carbon atoms, an alkylthio group with 1 to 20 carbon atoms, $OR^{15}$ ($R^{15}$ is hydrogen or an alkali metal), an alkoxy group with 1 to 20 carbon atoms, an aryloxy or heterocyclyloxy group; $R^{6*}$ and $R^{7*}$ independently are hydrogen or an alkyl group with 1 to 20 carbon atoms, or $R^{6*}$ and $R^{7*}$ together can form an alkylene group with 2 to 7, preferably 2 to 5 carbon atoms, wherein they form a 3-membered to 8-membered ring, preferably a 3-membered to 6-membered ring, and $R^{8*}$ is hydrogen, a straight-chain or branched alkyl group or aryl group with 1 to 20 carbon atoms; $R^{3*}$ and $R^{4*}$ are independently selected from the group comprising hydrogen, halogen (preferably fluorine or chlorine), alkyl groups with 1 to 6 carbon atoms and $COOR^{9*}$, wherein $R^{9*}$ is hydrogen, an alkali metal or an alkyl group with 1 to 40 carbon atoms, or $R^{1*}$ and $R^{3*}$ together can form a group of formula $(CH_2)_{n'}$, which may be substituted with 1 to 2n' halogen atoms or $C_1$ to $C_4$ alkyl groups, or can form the formula $C(=O)-Y^*-C(=O)$, wherein n' is from 2 to 6, preferably 3 or 4 and $Y^*$ is as defined hereinabove; and wherein at least 2 of the groups $R^{1*}$, $R^{2*}$, $R^{3*}$ and $R^{4*}$ are hydrogen or halogen.

These monomers include among others vinyl halides, such as vinyl chloride, vinyl fluoride, vinylidene chloride and vinylidene fluoride;

vinyl esters, such as vinyl acetate;

styrene, substituted styrenes with an alkyl substituent in the side chain, such as α-methylstyrene and α-ethylstyrene, substituted styrenes with an alkyl substituent on the ring, such as vinyltoluene and p-methylstyrene, halogenated styrenes such as monochlorostyrenes, dichlorostyrenes, tribromostyrenes and tetrabromostyrenes;

heterocyclic vinyl compounds, such as 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinylpyrrolidone, 2-vinylpyrrolidone, N-vinylpyrrolidine, 3-vinylpyrrolidine, N-vinylcaprolactam, N-vinylbutyrolactam, vinyloxolane, vinylfuran, vinylthiophene, vinylthiolane, vinylthiazoles and hydrogenated vinylthiazoles, vinyloxazoles and hydrogenated vinyloxazoles;

vinyl and isoprenyl ethers;

maleic acid derivatives, such as maleic anhydride, methylmaleic anhydride, maleimide, methylmaleimide;

dienes such as divinylbenzene; and (meth)acrylates.

Preferred monomers are (meth)acrylates. The expression (meth)acrylates includes methacrylates and acrylates as well as mixtures of the two. These monomers are widely known. They include among others (meth)acrylates derived from saturated alcohols, such as methyl (meth)acrylate, ethyl (meth)acrylate, propyl (meth)acrylate, butyl (meth)acrylate, pentyl (meth) acrylate, hexyl (meth)acrylate, 2-ethylhexyl (meth) acrylate, heptyl (meth)acrylate, 2-tert-butylheptyl (meth)acrylate, octyl (meth)acrylate, 3-iso-propylheptyl (meth)acrylate, nonyl (meth)acrylate, decyl (meth)acrylate, undecyl (meth)acrylate, 5-methylundecyl (meth)acrylate, dodecyl (meth)acrylate, 2-methyldodecyl (meth)acrylate, tridecyl (meth)acrylate, 5-methyltridecyl (meth)acrylate, tetradecyl (meth)acrylate, pentadecyl (meth)acrylate, hexadecyl (meth)acrylate, 2-methylhexadecyl (meth) acrylate, heptadecyl (meth)acrylate, 5-isopropylheptadecyl (meth)acrylate, 4-tert-butyloctadecyl (meth)acrylate, 5-ethyloctadecyl (meth) acrylate, 3-isopropyloctadecyl (meth)acrylate, octadecyl (meth)acrylate, nonadecyl (meth)acrylate, eicosyl (meth) acrylate, cetyleicosyl (meth)acrylate, stearyleicosyl (meth)acrylate, docosyl (meth)acrylate and/or eicosyltetratriacontyl (meth)acrylate;

(meth)acrylates derived from unsaturated alcohols, such as oleyl (meth)acrylate, 2-propynyl (meth)acrylate, allyl (meth)acrylate, vinyl (meth)acrylate, etc.;

amides and nitriles of (meth)acrylic acid, such as N-(3-dimethylaminopropyl) (meth)acrylamide, N-(diethylphosphono) (meth)acrylamide, 1-(meth)acryloylamido-2-methyl-2-propanol, N-(3-dibutylaminopropyl) (meth)acrylamide, N-t-butyl-N-(diethylphosphono) (meth)acrylamide, N,N-bis(diethylaminoethyl) (meth)acrylamide, 4-methacryloylamido-4-methyl-2-pentanol, methacryloylamidoacetonitrile, N-(methoxymethyl) (meth)acrylamide, N-(2-hydroxyethyl) (meth)acrylamide, N-(dimethylaminoethyl) (meth)acrylamide, N-methyl-N-phenyl (meth)acrylamide, N,N-diethyl (meth)acrylamide, N-acetyl (meth)acrylamide, N-methyl (meth)acrylamide, N-N-dimethyl (meth)acrylamide, N-isopropyl (meth)acrylamide;

aminoalkyl (meth)acrylates, such as tris(2-(meth)acryloxyethyl)amine, N-methylformamidoethyl (meth)acrylate, 3-diethylaminopropyl (meth)acrylate, 4-dipropylaminobutyl (meth)acrylate, 2-ureidoethyl (meth)acrylate;

other nitrogen-containing (meth)acrylates, such as N-((meth)acryloyloxyethyl) diisobutylketimine, 2-(meth)acryloyloxyethyl methylcyanamide, cyanomethyl (meth)acrylate;

aryl(meth)acrylates, such as benzyl (meth)acrylate or phenyl (meth)acrylate, wherein each of the aryl groups can be unsubstituted or be substituted at up to four positions;

carbonyl-containing (meth)acrylates, such as 2-carboxyethyl (meth)acrylate, N-(2-methacryloyloxyethyl)-2-pyrrolidinone, N-(3-methacryloyloxypropyl)-2-pyrrolidinone, carboxymethyl (meth)acrylate, N-methacryloylmorpholine, oxazolidinylethyl (meth)acrylate, N-(methacryloyloxy)formamide, acetonyl (meth)acrylate, N-methacryloyl-2-pyrrolidinone;

cycloalkyl (meth)acrylates, such as 3-vinylcyclohexyl (meth)acrylate, bornyl (meth)acrylate;

hydroxyalkyl (meth)acrylates such as 3-hydroxypropyl (meth)acrylate, 3,4-dihydroxybutyl (meth)acrylate, 2-hydroxyethyl (meth)acrylate, 2-hydroxypropyl (meth)acrylate;

glycol di(meth)acrylates, such as 1,4-butanediol (meth)acrylate;

methacrylates of ether alcohols, such as tetrahydrofurfuryl (meth)acrylate, vinyloxyethoxyethyl (meth)acrylate, methoxyethoxyethyl (meth)acrylate, 1-butoxypropyl (meth)acrylate, 1-methyl-(2-vinyloxy)ethyl (meth)acrylate, cyclohexyloxymethyl (meth)acrylate, methoxymethoxyethyl (meth)acrylate, benzyloxymethyl (meth)acrylate, furfuryl (meth)acrylate, 2-butoxyethyl (meth)acrylate, 2-ethoxyethoxymethyl (meth)acrylate, 2-ethoxyethyl (meth)acrylate, allyloxymethyl (meth)acrylate, 1-ethoxybutyl (meth)acrylate, methoxymethyl (meth)acrylate, 1-ethoxyethyl (meth)acrylate, ethoxymethyl (meth)acrylate;

methacrylates of halogenated alcohols, such as 2,3-dibromopropyl (meth)acrylate, 4-bromophenyl (meth)acrylate, 1,3-dichloro-2-propyl (meth)acrylate, 2-bromoethyl (meth)acrylate, 2-iodoethyl (meth)acrylate, chloromethyl (meth)acrylate;

oxiranyl (meth)acrylates, such as 10,11-epoxyundecyl (meth)acrylate, 2,3-epoxycyclohexyl (meth)acrylate, 2,3-epoxybutyl (meth)acrylate, 3,4-epoxybutyl (meth)acrylate, glycidyl (meth)acrylate;

methacrylates containing phosphorus, boron and/or silicon, such as 2-(dibutylphosphono)ethyl (meth)acrylate, 2,3-butylene(meth)acryloyl ethyl borate 2-(dimethylphosphato)propyl (meth)acrylate, methyl diethoxy(meth)acryloyl ethoxy silane, 2(ethylenephosphito)propyl (meth)acrylate, dimethylphosphinomethyl (meth)acrylate, dimethylphosphonoethyl (meth)acrylate, diethyl(meth)acryloyl phosphonate, diethylphosphatoethyl (meth)acrylate, dipropyl (meth)acryloyl phosphate;

sulfur-containing (meth)acrylates, such as ethylsulfinylethyl (meth)acrylate, 4-thiocyanatobutyl (meth)acrylate, ethylsulfonylethyl (meth)acrylate, thiocyanatomethyl (meth)acrylate, methylsulfinylmethyl (meth)acrylate, bis((meth)acryloyloxyethyl) sulfide;

tri(meth)acrylates, such as trimethyloylpropane tri(meth)acrylate; heterocyclic (meth)acrylates such as 2-(1-imidazolyl)ethyl (meth)acrylate, 2-(4-morpholinyl)ethyl (meth)acrylate and 1-(2-methacryloyloxyethyl)-2-pyrrolidone.

Particularly preferred are (meth)acrylates derived from saturated alcohols with 1 to 40 C atoms, preferably 6 to 24 C atoms, wherein the alcohol group may be straight-chain or branched.

The ester compounds with long-chain alcohol groups can be obtained, for example, by reaction of (meth)acrylates, fumarates, maleates and/or the corresponding acids with long-chain fatty alcohols, in which reaction a mixture of esters such as (meth)acrylates with alcohol groups of various chain lengths is generally obtained. These fatty alcohols include among others Oxo Alcohol® 7911, Oxo Alcohol® 7900 and Oxo Alcohol® 1100 of Monsanto; Alphanol® 79 of ICI; Nafol® 1620, Alfol® 610 and Alfol® 810 of Condea; Epal® 610 and Epal® 810 of Ethyl Corporation; Linevol® 79, Linevol® 911 and Dobanol® 25L of Shell AG; Lial® 125 of Augusta, Milan; Dehydad® and Lorol® of Henkel KGaA as well as Linopol® 7–11 and Acropol® 91 of Ugine Kuhlmann.

The ethylenically unsaturated monomers mentioned hereinabove can be used individually or as mixtures. In preferred embodiments of the inventive process, at least 50 weight per cent of the monomers, preferably at least 60 weight per cent of the monomers, especially preferably more than 80 wt % of the monomers, relative to the total weight of the ethylenically unsaturated monomers are (meth)acrylates. It is also possible to vary the monomer composition during polymerization, in order to obtain well defined structures such as block copolymers.

Above and beyond this, monomer compositions are preferred which contain at least 60 weight per cent, especially preferably more than 80 wt % of (meth)acrylates with alkyl or heteroalkyl chains containing at least 6 carbon atoms, relative to the total weight of the ethylenically unsaturated monomers.

Besides the (meth)acrylates, also preferred are maleates and fumarates, which preferably also contain long-chain alcohol groups.

For example, a most particularly preferred monomer composition comprises the following ethylenically unsaturated monomers:

a) 60 to 100 wt %, especially 80 to 100 wt % of one or more (meth)acrylates of formula

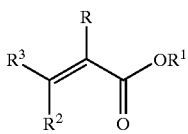
(I)

wherein R denotes hydrogen or methyl, $R^1$ denotes a straight-chain or branched alkyl group with 6 to 40 carbon atoms, preferably 6 to 24 carbon atoms, $R^2$ and $R^3$ independently denote hydrogen or a group of the formula —COOR', wherein R' denotes hydrogen or a straight-chain or branched alkyl group with 6 to 40 carbon atoms, b) 0 to 40 wt %, especially 0.5 to 20 wt % of one or more (meth)acrylates of formula (II)

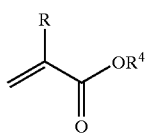

wherein R denotes hydrogen or methyl and $R^4$ denotes a straight-chain or branched alkyl group with 1 to 5 carbon atoms, c) 0 to 40 wt %, especially 0.5 to 20 wt % of one or more (meth)acrylates of formula (III)

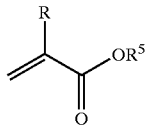

wherein R denotes hydrogen or methyl and $R^5$ denotes an alkyl group substituted with an OH group and containing 2 to 20, especially 2 to 6 carbon atoms, or an alkoxylated group of formula (IV)

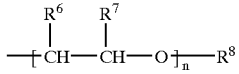

wherein $R^6$ and $R^7$ independently denote hydrogen or methyl, $R^8$ denotes hydrogen or an alkyl group with 1 to 40 carbon atoms, and n stands for an integral number from 1 to 60, d) 0 to 40 wt %, especially 0.5 to 20 wt % of one or more (meth)acrylates of formula (V)

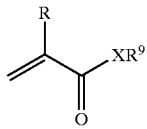

wherein R denotes hydrogen or methyl, X denotes oxygen or an amino group of formula —NH— or —$NR^{10}$—, in which $R^{10}$ stands for an alkyl group with 1 to 40 carbon atoms, and $R^9$ denotes a straight-chain or branched alkyl group substituted with at least one —$NR^{11}R^{12}$—group and containing 2 to 20, preferably 2 to 6 carbon atoms, wherein $R^{11}$ and $R^{12}$ independently stand for hydrogen, an alkyl group with 1 to 20, preferably 1 to 6 [carbon atoms], or in which $R^{11}$ and $R^{12}$ form a 5-membered or 6-membered ring, which includes the nitrogen atom and possibly one further nitrogen or oxygen atom, and which may also be substituted with $C_1$ to $C_6$ alkyl, and e) 0 to 40 wt %, especially 0.5 to 20 wt % of one or more comonomers, wherein the value in wt % is in each case relative to the total weight of ethylenically unsaturated monomers.

Examples of these monomers have been cited in the foregoing.

Comonomers are ethylenically unsaturated monomers that can be copolymerized with the (meth)acrylates of formulas I, II, III and/or V. Besides styrene, preferred comonomers include in particular monomers which have dispersing effects, such as the heterocyclic vinyl compounds mentioned hereinabove.

It must be pointed out at this place that halogen-containing monomers can be incorporated into the polymer during the polymerization. Thus these monomers interfere with neither the polymerization nor the subsequent halogen reduction, since only the living halogens are eliminated by the inventive reaction of the ATRP polymer with at least one organic compound. Within the scope of the present invention, however, halogen-free monomers are preferred to those monomers which contain halogens.

The monomers mentioned hereinabove are polymerized by means of initiators that contain a transferable halogen. In general, these initiators can be described by the formula $Y-(X)_m$, wherein Y represents the core molecule, which is assumed to form radicals, X represents a transferable halogen and m denotes an integral number in the range of 1 to 10, depending on the functionality of group Y. If m>1, the various transferable halogens X can have different meanings. If the functionality of the initiator is >2, star polymers are obtained. Preferred transferable halogens are Cl, Br and/or I.

As mentioned hereinabove, it is assumed that group Y forms radicals that function as starter molecules, in that this radical adds onto the ethylenically unsaturated monomers. Thus group Y preferably has substituents that can stabilize the radicals. Such substituents include among others —CN, —COR and —$CO_2R$, wherein R in each case denotes an alkyl or aryl group, or aryl and/or heteroaryl groups.

Alkyl groups are saturated or unsaturated, branched or straight-chain hydrocarbon groups with 1 to 40 carbon atoms, such as methyl, ethyl, propyl, butyl, pentyl, 2-methylbutyl, pentenyl, cyclohexyl, heptyl, 2-methylheptenyl, 3-methylheptyl, octyl, nonyl, 3-ethylnonyl, decyl, undecyl, 4-propenylundecyl, dodecyl, tridecyl, tetradecyl, pentadecyl, hexadecyl, heptadecyl, octadecyl, nonadecyl, eicosyl, cetyleicosyl, docosyl and/or eicosyltetratriacontyl.

Aryl groups are cyclic aromatic groups having 6 to 14 carbon atoms in the aromatic ring. These groups may be substituted. Examples of substituents are straight-chain and branched alkyl groups with 1 to 6 carbon atoms, such as methyl, ethyl, propyl, butyl, pentyl, 2-methylbutyl or hexyl; cycloalkyl groups such as cyclopentyl and cyclohexyl; aromatic groups such as phenyl or naphthyl; amino groups, ether groups, ester groups as well as halides.

Examples of aromatic groups include phenyl, xylyl, toluyl, naphthyl or biphenyl.

The expression "heteroaryl" denotes a heteroaromatic ring system, wherein at least one CH group is replaced by N or two neighboring CH groups are replaced by S, O or NH, such as a thiophene, furan, pyrrole, thiazole, oxazole, pyridine, pyrimidine and benzo[a]furan group, which may also contain the substituents mentioned hereinabove.

An initiator that is usable according to the invention can be any compound that contains one or more atoms or groups of atoms which can be transferred by a radical mechanism under the polymerization conditions.

Suitable initiators include those of the formulas:

$R^{11}R^{12}R^{13}C—X$
$R^{11}C(=O)—X$
$R^{11}R^{12}R^{13}Si—X$
$R^{11}R^{12}N—X$
$R^{11}N—X_2$
$(R^{11})_nP(O)_m—X_{3-n}$
$(R^{11}O)_nP(O)_m—X_{3-n}$ and
$(R^{11})(R^{12}O)P(O)_m—X$, wherein X is selected from the group comprising Cl, Br, I; and $R^{11}$, $R^{12}$ and $R^{13}$ are chosen independently from the group comprising hydrogen, halogens, alkyl groups with 1 to 20, preferably 1 to 10 and especially preferably 1 to 6 carbon atoms, cycloalkyl groups with 3 to 8 carbon atoms, $R^{8*}_3Si$, $C(=Y^*)R^{5*}$, $C(=Y^*)NR^{6*}R^{7*}$, wherein $Y^*$, $R^{5*}$, $R^{6*}$ and $R^{7*}$ are as defined hereinabove, COCl, OH (preferably one of the groups $R^{11}$, $R^{12}$ and $R^{13}$ is OH), CN, alkenyl or alkynyl groups with 2 to 20 carbon atoms, preferably 2 to 6 carbon atoms and especially preferably allyl or vinyl, oxiranyl, glycidyl, alkylene or alkenylene groups with 2 to 6 carbon atoms, which are substituted with oxiranyl or glycidyl, aryl, heterocyclyl, aralkyl, aralkenyl (aryl-substituted alkenyl, wherein aryl is as defined hereinabove and alkenyl is vinyl substituted with one or two $C_1$ to $C_6$ alkyl groups and/or halogen atoms, preferably with chlorine), alkyl groups with 1 to 6 carbon atoms, in which one to all of the hydrogen atoms, preferably one, are substituted by halogen (preferably fluorine or chlorine, if one or more hydrogen atoms are replaced, and preferably fluorine, chlorine or bromine if one hydrogen atom is replaced), alkyl groups with 1 to 6 carbon atoms, which are substituted with 1 to 3 substituents (preferably 1) chosen from the group comprising $C_1$ to $C_4$ alkoxy, aryl, heterocyclyl, $C(=Y^*)R^{5*}$ (wherein $R^{5*}$ is as defined hereinabove), $C(=Y^*)NR^{6*}R^{7*}$ (wherein $R^{6*}$ and $R^{7*}$ are as defined hereinabove), oxiranyl and glycidyl (preferably not more than 2 of the groups $R^{11}$, $R^{12}$ and $R^{13}$ are hydrogen, and especially preferably at most one of the groups $R^{11}$, $R^{12}$ and $R^{13}$ is hydrogen);

m=0 or 1; and n denotes 0, 1 or 2.

The particularly preferred initiators include benzyl halides, such as p-chloromethylstyrene, α-dichloroxylene, α,α-dichloroxylene, α,α-dibromoxylene and hexakis(α-bromomethyl)benzene, benzyl chloride, benzyl bromide, 1-bromo-1-phenylethane and 1-chloro-1-phenylethane; carboxylic acid derivatives which are halogenated at the α-position, such as propyl 2-bromopropionate, methyl 2-chloropropionate, ethyl 2-chloropropionate, methyl 2-bromopropionate, ethyl 2-bromoisobutyrate; tosyl halides such as p-toluenesulfonyl chloride; alkyl halides such as tetrachloromethane, tribromomethane, 1-vinylethyl chloride, 1-vinylethyl bromide; and halogen derivatives of phosphoric acid esters, such as dimethylphosphoric acid chloride.

The initiator is generally used in a concentration in the range of $10^{-4}$ mol/l to 3 mol/l, preferably in the range of $10^{-3}$ mol/l to $10^{-1}$ mol/l and especially preferably in the range of $5*10^{-2}$ mol/l to $5*10^{-1}$ mol/l, although these values are not to be construed as limitative. From the ratio of initiator to monomer there is obtained the molecular weight of the polymer, if the entire monomer is reacted. Preferably this ratio ranges between $10^{-4}$ and 1 to between 0.5 and 1, especially preferably between $1*10^{-3}$ and 1 to between $5*10^{-2}$ and 1.

To carry out the polymerization there are used catalysts that comprise at least one transition metal. For this purpose there can be used any transition metal compound that can participate in a redox cycle with the initiator or with the polymer chain, which contains a transferable group of atoms. In these cycles the transferable group of atoms and the catalyst reversibly form a compound, wherein the oxidation number of the transition metal is raised or lowered. It is assumed that radicals are liberated and trapped in this process, and so the radical concentration remains very low. It is also possible, however, that the insertion of ethylenically unsaturated monomers into the Y—X or $Y(M)_z$—X bond is made possible or facilitated by the addition of the transition metal compound to the transferable group of atoms, where Y and X have the same meaning as given hereinabove and M denotes the monomers, while z indicates the degree of polymerization.

Preferred transition metals for this purpose are Cu, Fe, Co, Cr, Ne, Sm, Mn, Mo, Ag, Zn, Pd, Pt, Re, Rh, Ir, In, Yb and/or Ru, which can be used in appropriate oxidation numbers. These metals can be used individually and also as mixtures. It is assumed that these metals catalyze the redox cycles of the polymerization. In this connection, the $Cu^+/Cu^{2+}$ or $Fe^{2+}/Fe^{3+}$ redox couple, for example, is effective. Accordingly, the metal compounds are added to the reaction mixture in the form of halides such as chloride or bromide, as alkoxide, hydroxide, oxide, sulfate, phosphate, or hexafluorophosphate, trifluoromethanesulfate. The preferred metal compounds include $Cu_2O$, CuBr, CuCl, CuI, $CuN_3$, CuSCN, CuCN, $CuNO_2$, $CuNO_3$, $CuBF_4$, $Cu(CH_3COO)$, $Cu(CF_3COO)$, $FeBr_2$, $RuBr_2$, $CrCl_2$ and $NiBr_2$.

It is also possible, however, to use compounds with higher oxidation numbers, such as $CuBr_2$, $CuCl_2$, CuO, $CrCl_3$, $Fe_2O_3$ and $FeBr_3$. In these cases the reaction can be initiated by means of classical radical sources, such as AIBN. In this case the transition metal compounds are reduced first of all, since they are reacted with the radicals generated from the classical radical sources. Such a process is reverse ATRP, as described by Wang and Matyjaszewski in Macromolecules (1995), Vol. 28, pp. 7572–7573.

Furthermore, the transition metals can be used for catalysis in the form of metals of oxidation number zero, especially in a mixture with the compounds mentioned hereinabove, as is described in, for example, International Patent WO 98/40415. In these cases the reaction velocity of the reaction can be increased. It is assumed that hereby the concentration of catalytically active transition metal compound is increased by using equal proportions of transition metals having high oxidation numbers and of metallic transition metal.

The preferred transition metals include metallic copper, which can be added to the reaction mixture in the form, for example, of copper sheet, copper wire, copper foil, copper shavings, copper gauze, copper braid, copper textile and or copper powder as well as copper dust. In this connection, sources that can be readily separated once again from the polymer composition, such as copper sheet, copper wire, copper foil and copper braid are preferred over sources that are less easy to separate, such as copper powder or copper dust.

In general, the molar ratio of transition metal to initiator ranges from 0.0001:1 to 10:1, preferably from 0.001:1 to 5:1 and especially preferably from 0.01:1 to 2:1, although these values are not to be construed as limitative.

The polymerization takes place in the presence of ligands that can form a coordination compound with the metallic catalyst or catalysts. Among other effects, these ligands function to increase the solubility of the transition metal compound. A further important function of the ligands is that the formation of stable organometallic compounds is prevented. This is particularly important, since these stable compounds would not polymerize under the chosen reaction conditions. It is further assumed that the ligands facilitate abstraction of the transferable group of atoms.

These ligands are known in themselves and are described in, for example, International Patents WO 97/18247 and WO 98/40415. These compounds generally contain one or more nitrogen, oxygen, phosphorus and/or sulfur atoms, via which the metal atom can be bound. Many of these ligands can be represented in general by the formula $R^{16}$—Z—$(R^{18}$—Z$)_m$—$R^{17}$, wherein $R^{16}$ and $R^{17}$ independently denote H, $C_1$ to $C_{20}$ alkyl, aryl, heterocyclyl, which may or may not be substituted, and m represents an integral number ranging from 0 to 10. Such substituents include among others alkoxy groups and alkylamino groups. $R^{16}$ and $R^{17}$ may or may not form a saturated, unsaturated or heterocyclic ring. Z denotes O, S, NH, $NR^{19}$ or $PR^{19}$, wherein $R^{19}$ has the same meaning as $R^{16}$. $R^{18}$ independently denotes a divalent group with 1 to 40 C atoms, preferably 2 to 4 C atoms, which may be straight-chain, branched or cyclic, such as a methylene, ethylene, propylene or butylene group. The meaning of alkyl and aryl has been explained hereinabove. Heterocyclyl groups are cyclic groups with 4 to 12 carbon atoms, in which one or more of the $CH_2$ groups of the ring is or are replaced by heteroatom-containing groups, such as O, S, NH and/or NR, wherein the group R has the same meaning as $R^{16}$.

A further group of suitable ligands can be represented by the formula

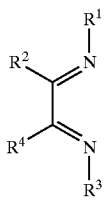

wherein $R^1$, $R^2$, $R^3$ and $R^4$ independently denote H, $C_1$ to $C_{20}$ alkyl, aryl, heterocyclyl and/or heteroaryl groups, wherein the groups $R^1$ and $R^2$ or respectively $R^3$ and $R^4$ can together form a saturated or unsaturated ring.

Preferred ligands in this connection are chelate ligands containing N atoms.

The preferred ligands include among others triphenylphosphane, 2,2-bipyridine, alkyl-2,2-bipyridine, such as 4,4-di-(5-nonyl)-2,2-bipyridine, 4,4-di-(5-heptyl)-2,2-bipyridine, tris(2-aminoethyl)amine (TREN), N,N,N',N',N"-pentamethyldiethylenetriamine, 1,1,4,7,10,10-hexamethyltriethylenetetramine and/or tetramethylethylenediamine. Further preferred ligands are described in, for example, International Patent WO 97/47661. The ligands can be used individually or as a mixture.

These ligands can form coordination compounds in situ with the metal compounds, or they can be synthesized first as coordination compounds and then added to the reaction mixture.

The ratio of ligand to transition metal depends on the dentate number of the ligand and on the coordination number of the transition metal. In general, the molar ratio ranges from 100:1 to 0.1:1, preferably from 6:1 to 0.1:1 and especially preferably from 3:1 to 0.5:1, although these values are not to be construed as limitative.

The monomers, transition metal catalysts, ligands and initiators are selected as a function of the desired polymer solution. It is assumed that a high rate constant of the reaction between the complex of transition metal with ligand and the transferable group of atoms is essential for a narrow molecular weight distribution. If the rate constant of this reaction is too low, the concentration of radicals becomes too high, and so the typical termination reactions responsible for a broad molecular weight distribution occur. The exchange rate depends on, for example, the transferable group of atoms, the transition metal, the ligands and the anion of the transition metal compound. The person skilled in the art will find useful guides to selection of these components in, for example, International Patent WO 98/40415.

The polymerization can be performed at normal, reduced or above-atmospheric pressure. The polymerization temperature also is not critical. In general, however, it ranges from −20° to 200° C., preferably from 0° to 130° C. and especially preferably from 60° to 120° C., although these values are not to be construed as limitative.

By means of the present process, polymers with a predetermined architecture can be obtained in simple manner. These possibilities result from the "living" character of the polymerization process. Such structures include among others block copolymers, gradient copolymers, star polymers, highly branched polymers, polymers with reactive terminal groups and graft copolymers.

It may be of special interest for the inventive process to synthesize, in the polymer composition, a copolymer with non-statistical structure, preferably a two-block, three-block or gradient polymer.

The polymers synthesized within the scope of the invention generally have a molecular weight ranging from 1,000 to 1,000,000 g/mol, preferably from $5*10^3$ to $500*10^3$ g/mol and especially preferably from $10*10^3$ to $300*10^3$ g/mol, although these values are not to be construed as limitative. These values refer to the weight-average molecular weight of the polydisperse polymers in the composition.

The special advantage of ATRP compared with conventional radical polymerization processes is that polymers with a narrow molecular weight distribution can be synthesized. While the following values are not to be construed as limitative, polymers obtained by the inventive process have a polydispersity, expressed by $M_w/M_n$, ranging from 1 to 12, preferably from 1 to 4.5, especially preferably from 1 to 3 and most particularly preferably from 1.05 to 2.

The polymerization as a partial step of the present synthesis process can be performed with or without solvent. It is characteristic of the process that reduction of the halogen content of the polymers present in the composition takes place in a nonpolar solvent by reaction with an organic nitrogen compound.

Accordingly, an appropriate solvent can be added before the reaction with an organic nitrogen compound or else after the polymerization, or else the polymerization takes place in the presence of a nonpolar solvent. The term solvent is to be understood broadly in the present connection. For example, unreacted monomers that remain in the composition after the polymerization can also function as solvents.

As a measure for the polarity of the solvent there can be used the dielectric constant, which is preferably ≦4, expediently ≦3 and most particularly preferably ≦2.5. This value is determined at 20° C., and the person skilled in the art can find useful guidelines on the measurement in Ullmanns Encyclopedia of Industrial Chemistry, 1966, Volume II/2, pages 455 to 479.

According to an interesting viewpoint of the inventive process, the catalyst can be separated by a solid-liquid separation method after the polymerization. Chromatography, centrifugation and filtration are examples of techniques for this purpose.

Preferably the catalyst is removed by filtration. For this purpose the oxidation number of the transition metal is raised following polymerization. Oxidation of the transition metal leads to decreased catalyst solubility, to a degree depending on the choice of ligand or ligands, and so the transition metal can be separated by filtration in the presence of a solvent, especially a mineral oil, whose dielectric constant is $\leq 4$, preferably $\leq 3$ and especially preferably $\leq 2.5$.

Oxidation of the transition metal can be achieved with known oxidizing agents such as oxygen, $H_2O_2$ or ozone. Preferably the catalyst will be oxidized with atmospheric oxygen. Complete oxidation of the transition metal or of the transition metal compound is not necessary. In many cases it is sufficient to bring the composition into contact with atmospheric oxygen for a few minutes in order to ensure sufficient precipitation of the transition metal compound.

Filtration is known in itself and is described in, for example, Ullmann's Encyclopedia of Industrial Chemistry, Fifth Edition, key word "Filtration". Preferably the composition is purified at a pressure difference ranging from 0.1 to 50 bar, preferably 1 to 10 bar and especially preferably 1.5 to 2.5 bar with a filter having a sieve size ranging from 0.01 $\mu$m to 1 mm, preferably 1 $\mu$m to 100 $\mu$m and especially preferably 10 $\mu$m to 100 $\mu$m. These values are to be considered as reference points, since the purification also depends on the viscosity of the solvent and on the particle size of the precipitate.

The filtration is performed in a temperature range similar to that of polymerization, the upper range being dependent on the stability of the polymers. The lower limit is determined by the viscosity of the solution.

The polymer composition synthesized in this way can be used without further purification as, for example, an additive in lubricating oils. Furthermore, the polymer can be isolated from the composition. For this purpose the polymers can be separated from the composition by precipitation.

The invention will be explained in more detail hereinafter by examples and comparison examples, although the invention is not to be construed as limited to these examples.

I) Particulars of Starting Materials and Methods

I.1) Starting Materials

The alkyl methacrylate mixture of $C_{12}$ to $C_{18}$ alcohols used, obtainable by transesterification of MMA with Lial 125 of Augusta® of Milan, was weighed out, assuming a purity of 98%. $Cu_2O$ (particle size 5 $\mu$m), EBiB (ethyl 2-bromoisobutyrate), PMDETA (pentamethyldiethylenetriamine), DETA (diethylenetriamine) TMEDA (tetramethylethylenediamine) as well as Primine 81R ($NH_2$—$C_{13}H_{27}$) were obtained from Aldrich and, in common with MMA (methyl methacrylate; Rohm), were weighed out as assuming a purity of 100%. The mineral oil used was an oil of the Shell Co. (SM 920; composition: 0.84% n-alkanes with about 18 to 31 C atoms, 5.16% slightly branched alkanes with 18 to 31 atoms, 8.8% aromatics with 14 to 32 C atoms, 71.4% isoalkanes and cycloalkanes with 20 to 32 C atoms, 0.6% polar compounds, 13.2% loss). Tonsil L80 FF of Südchemie was used to prepare the Tonsil column.

I.2 Analysis Methods

The samples were worked up by purification over an $Al_2O_3$/Tonsil (2:1) column. Hereby all catalyst residues as well as precipitates were separated. The samples were then digested according to Schöniger, after which the Br content was determined argentometrically.

II. Execution of the Examples and Comparison Examples

EXAMPLE I 41.6 g (0.416 mol) of MMA and 278.4 g of an alkyl methacrylate mixture of $C_{12}$ to $C_{18}$ alcohols in 80 g of mineral oil were placed in a 750 ml four-necked flask, through which nitrogen was flowing, equipped with sickle-shaped stirrer, reflux condenser and internal thermometer, and were inerted by addition of dry ice.

0.55 g (0.1 mol) of PMDETA followed by 7.34 g (0.05 mol) of finely powdered $Cu_2O$ was added, after which the reaction mixture was heated from room temperature to 90° C. As soon as the solution had reached the desired temperature, 6.24 g (1 mol) of Ebib was added. The temperature was then raised to 95° C. After 6 hours, 8.25 g (1.5 mol) of PMDETA was added, and the temperature was then raised to 110° C.

After 24 hours a sample was taken and then cooled, worked up and analyzed.

The obtained sample had a polydispersity of 1.32 as well as an $M_n$ value of 12,900 g/mol, as determined by means of GPC. One gram of the purified sample contained 8 $\mu$g of copper and 38 $\mu$g of bromine.

EXAMPLE 2

The polymerization was carried out as in Example 1, except that 16.5 g (3 mol) of PMDETA was added after 6 hours and then the temperature was raised to 110° C.

After 24 hours a sample was taken and then cooled, worked up and analyzed.

The obtained sample had a polydispersity of 1.27 as well as an $M_n$ value of 13,600 g/mol, as determined by means of GPC. One gram of the purified sample contained 12 $\mu$g of copper and less than 50 $\mu$g of bromine.

EXAMPLE 3

The polymerization was carried out as in Example 1, except that 8.25 g (1.5 mol) of PMDETA was added after 6 hours and then the temperature was raised to 130° C.

After 24 hours a sample was taken and then cooled, worked up and analyzed.

The obtained sample had a polydispersity of 1.31 as well as an $M_n$ value of 13,100 g/mol, as determined by means of GPC. One gram of the purified sample contained 11 $\mu$g of copper and 95 $\mu$g of bromine.

COMPARISON EXAMPLE 1

The polymerization was carried out as in Example 1, except that, after 6 hours, the temperature was raised to 110° C. without addition of PMDETA.

After 24 hours the solution was cooled, worked up and analyzed. One gram of the purified solution contained 3875 $\mu$g of bromine, while the polymer had a polydispersity of 1.26 as well as an $M_n$ value of 13,000 g/mol, as determined by means of GPC.

EXAMPLE 4

The polymerization was carried out as in Example 1, except that 2.2 g (0.4 mol) of PMDETA and 66.06 g (0.45 mol) of $Cu_2O$ were added after 6 hours and then the temperature was raised to 110° C. After 24 hours the solution was cooled, worked up and analyzed. One gram of the purified solution contained 5 μg of copper and 469 μg of bromine, while the polymer had a polydispersity of 1.30 as well as an $M_n$ value of 14,100 g/mol, as determined by means of GPC.

EXAMPLE 5

The polymerization was carried out as in Example 1, except that 4.95 g (0.9 mol) of PMDETA and 139.46 g (0.45 mol) of $Cu_2O$ were added after 6 hours and then the temperature was raised to 110° C.

After 24 hours the solution was cooled, worked up and analyzed. One gram of the purified solution contained 800 μg of copper and 943 μg of bromine, while the polymer had a polydispersity of 1.32 as well as an $M_n$ value of 14,600 g/mol, as determined by means of GPC.

EXAMPLE 6

The polymerization was carried out as in Example 1, except that 4.94 g (1.5 mol) of DETA was added after 6 hours and then the temperature was raised to 110° C.

After 24 hours the solution was cooled, worked up and analyzed. One gram of the purified solution contained 529 μg of bromine.

EXAMPLE 7

The polymerization was carried out as in Example 1, except that 28.8 g (4.5 mol) of Primine 81R was added after 6 hours and then the temperature was raised to 110° C.

After 24 hours the solution was cooled, worked up and analyzed. One gram of the purified solution contained 848 μg of bromine.

EXAMPLE 8

The polymerization was carried out as in Example 1, except that 8.4 g (2.26 mol) of TMEDA was added after 6 hours and then the temperature was raised to 110° C.

After 24 hours the solution was cooled, worked up and analyzed. One gram of the purified solution contained 199 μg of bromine.

EXAMPLE 9

The polymerization was carried out as in Example 1, except that, once 8.25 g (1.5 mol) of PMDETA had been added after 6 hours, the temperature was maintained at 95° C.

After 24 hours the solution was cooled, worked up and analyzed. One gram of the purified solution contained 89 μg of bromine.

COMPARISON EXAMPLE 2

The polymerization was carried out as in Example 1, except that 8.4 g (1.5 mol) of α-methylstyrene was added after 6 hours. The temperature was maintained at 95° C.

After 24 hours the solution was cooled, worked up and analyzed. One gram of the purified solution contained 4625 μg of bromine.

What is claimed is:

1. A process for the synthesis of a polymer composition having a reduced living halogen content, comprising:
polymerizing at least one ethylenically unsaturated monomer using a) at least one initiator containing a transferable halogen and b) one or more metal catalysts comprising at least one transition metal, in the presence of ligands which can form a coordination compound with said one or more metal catalysts, to obtain a polymer composition having a living halogen content, and after said polymerizing, reacting said polymer composition having a living halogen content with at least one organic nitrogen compound in the presence of a non-polar solvent, thereby reducing the living halogen content to obtain said polymer composition having a reduced living halogen content;

wherein said reduced living halogen content is ≦100 ppm in said polymer composition having a reduced living halogen content.

2. The process according to claim 1, wherein said non-polar solvent is used in a proportion of 5 to 95 wt % relative to a total weight of a reaction mixture present during said reacting.

3. The process according to claim 1, wherein a mineral oil, a synthetic oil or mixtures thereof are used as said nonpolar solvent.

4. The process according to claim 3, wherein said mineral oil comprises 0.5 to 30 wt % of aromatic constituents, 15 to 40 wt % of naphthenic constituents, 35 to 80 wt % of paraffinic constituents, up to 3 wt % of n-alkanes, and 0.05 to 5 wt % of polar compounds, each relative to a total weight of said mineral oil.

5. The process according to claim 1, wherein one or more heterocyclic aromatic nitrogen compounds are used as said organic nitrogen compound.

6. The process according to claim 5, wherein said organic nitrogen compound is a compound which contains one or more pyridine groups.

7. The process according to claim 1, wherein one or more aliphatic nitrogen compounds are used as said organic nitrogen compound.

8. The process according to claim 7, wherein said organic nitrogen compound contains one or more amine groups.

9. The process according to claim 8, wherein an amine compound in which at least one methyl group is bound to its nitrogen atom is used as said organic nitrogen compound.

10. The process according to claim 1, wherein said organic nitrogen compound is used in an excess relative to said initiator used for said polymerizing.

11. The process according to claim 10, wherein a molar ratio of organic nitrogen compound to living halogen ranges from 0.5:1 to 10:1.

12. The process according to claim 1, wherein after said polymerizing, said polymer composition having a living halogen content is reacted at a temperature of from 20 to 200° C.

13. The process according to claim 1, wherein after said polymerizing, said polymer composition having a living halogen content is reacted with said organic nitrogen compound for at least 1 hour.

14. The process according to claim 1, wherein said ethylenically unsaturated monomers comprise 50 to 100 wt %, relative to a total weight of the ethylenically unsaturated monomers, of one or more ethylenically unsaturated ester compounds of formula (I)

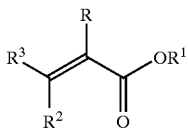

wherein
R denotes hydrogen or methyl,
$R^1$ denotes a straight-chain or branched alkyl group with 8 to 40,
$R^2$ and $R^3$ independently denote hydrogen or a group of the formula —COOR', wherein R' denotes hydrogen or a straight-chain or branched alkyl group with 8 to 40.

15. The process according to claim 1, wherein said ethylenically unsaturated monomers comprise at least 50 wt % of one or more (meth)acrylates of formula (II)

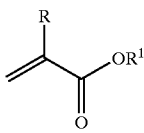

wherein
R denotes hydrogen or methyl, and
$R^1$ denotes a straight-chain or branched alkyl group with 8 to 40.

16. The process according to claim 1, wherein said ethylenically unsaturated monomers comprise
a) 60 to 100 wt % of one or more ethylenically unsaturated ester compounds of formula (I)

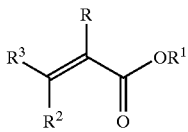

wherein
R denotes hydrogen or methyl,
$R^1$ denotes a straight-chain or branched alkyl group with 8 to 40,
$R^2$ and $R^3$ independently denote hydrogen or a group of the formula —COOR', wherein R' denotes hydrogen or a straight-chain or branched alkyl group with 8 to 40, b) 0 to 40 wt % of one or more (meth)acrylates of formula (III)

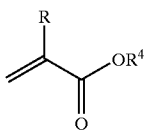

wherein
R denotes hydrogen or methyl, and
$R^4$ denotes a straight-chain or branched alkyl group with 1 to 7 carbon atoms, c) 0 to 40 wt % of one or more (meth)acrylates of formula (IV)

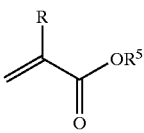

wherein
R denotes hydrogen or methyl, and
$R^5$ denotes an alkyl group, substituted with an OH group, with 2 to 20 carbon atoms, or an ethoxylated group of formula (V)

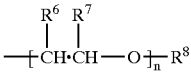

wherein
$R^6$ and $R^7$ independently stand for hydrogen or methyl,
$R^8$ stands for hydrogen or an alkyl group with 1 to 40 carbon atoms, and
n stands for an integral number from 1 to 60, d) 0 to 40 wt % of one or more (meth)acrylates of formula (VI)

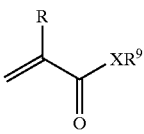

wherein
R denotes hydrogen or methyl,
X denotes oxygen or an amino group of formula —NH— or —$NR^{10}$—, wherein $R^{10}$ stands for an alkyl group with 1 to 40 carbon atoms, and
$R^9$ denotes a straight-chain or branched alkyl group, substituted by at least one —$NR^{11}R^{12}$ group, with 2 to 20, wherein $R^{11}$ and $R^{12}$ independently of one another stand for hydrogen, an alkyl group with 1 to 20, or wherein $R^{11}$ and $R^{12}$ form a 5-membered or 6-membered ring, which includes the nitrogen atom and possibly one further nitrogen or oxygen atom, and which is optionally substituted with $C_1$ to $C_6$ alkyl, and e) 0 to 40 wt % of one or more comonomers,
wherein the wt % value in each of a)–e) is relative to the total weight of ethylenically unsaturated monomers.

17. The process according to claim 16, wherein styrene, (meth)acrylate derivatives, dispersing monomers or mixtures thereof are used as comonomers.

18. The process according to claim 1, wherein said catalyst is metallic copper, $Cu_2O$, CuBr, CuCl, CuI, $CuN_3$, CuSCN, CuCN, $CuNO_2$, $CuNO_3$, $CuBF_4$, $Cu(CH_3COO)$ or $Cu(CF_3COO)$.

19. The process according to claim 1, wherein at least one chelate ligand containing N atoms is used.

20. The process according to claim 1, wherein said initiator contains Cl, Br, I or mixtures thereof as the transferable halogen.

21. The process according to claim 1, wherein said catalyst and a halogen compound eliminated from the polymer are separated by solid-liquid separation.

22. A polymer composition having a reduced living halogen content, comprising:

a living halogen content of $\leq 100$ ppm;

wherein said polymer composition having the reduced living halogen content is obtained by a process comprising polymerizing at least one ethylenically unsaturated monomer using a) at least one initiator containing a transferable halogen and b) one or more metal catalysts comprising at least one transition metal, in the presence of ligands which can form a coordination compound with said one or more metal catalysts, to obtain a polymer composition having a living halogen content, and after said polymerizing, reacting said polymer composition having a living halogen content with at least one organic nitrogen compound in the presence of a nonpolar solvent, thereby reducing the living halogen content to obtain said polymer composition having a reduced halogen content.

23. A method, comprising:

adding said polymer composition according to claim 22 to one or more lubricating oils.

24. The process according to claim 9, wherein said amine compound is selected from the group consisting of hexamethyltriethylenetetramine, PMDETA and TMEDA.

25. The polymer composition according to claim 22, wherein said at least one organic nitrogen compound is at least one compound selected from the group consisting of PMDETA and hexamethylene diamine.

* * * * *